S. L. G. KNOX.
LEVELING AND PLOWING MACHINE.
APPLICATION FILED NOV. 24, 1920.
1,419,866.
Patented June 13, 1922.
2 SHEETS—SHEET 1.
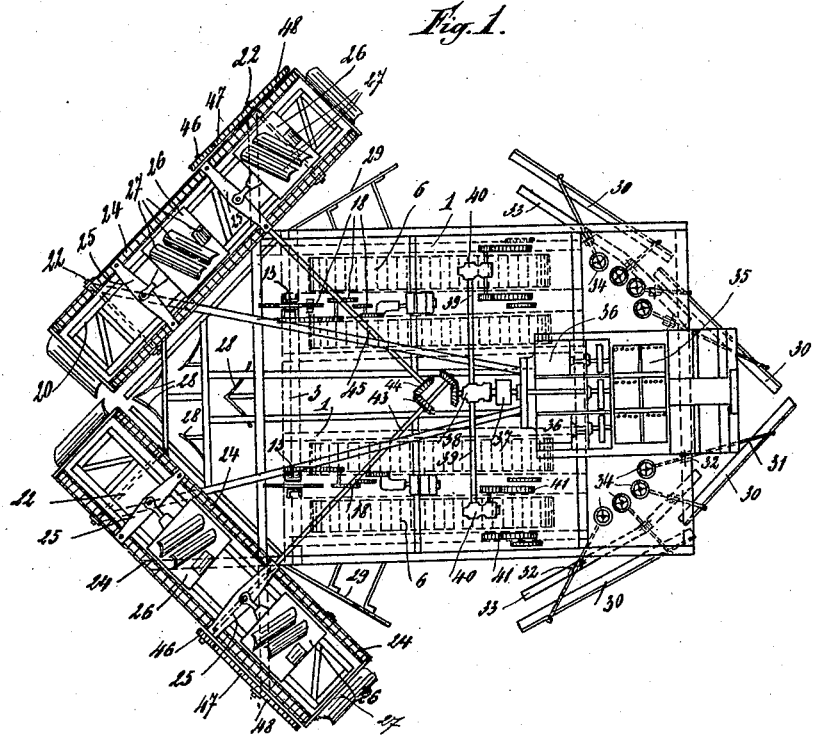
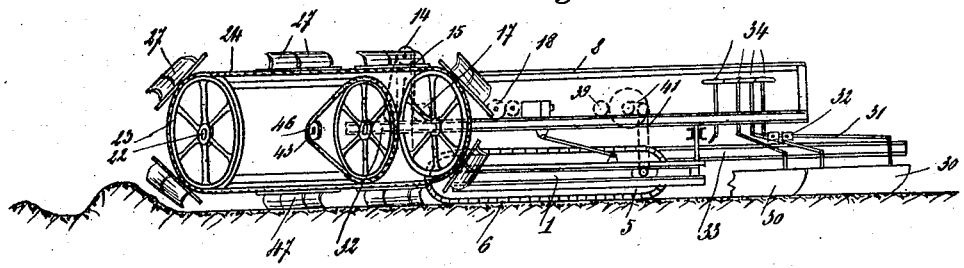
Inventor
S. L. G. Knox S. L. G. KNOX.
LEVELING AND PLOWING MACHINE.
APPLICATION FILED NOV. 24, 1920.
1,419,866.
Patented June 13, 1922.
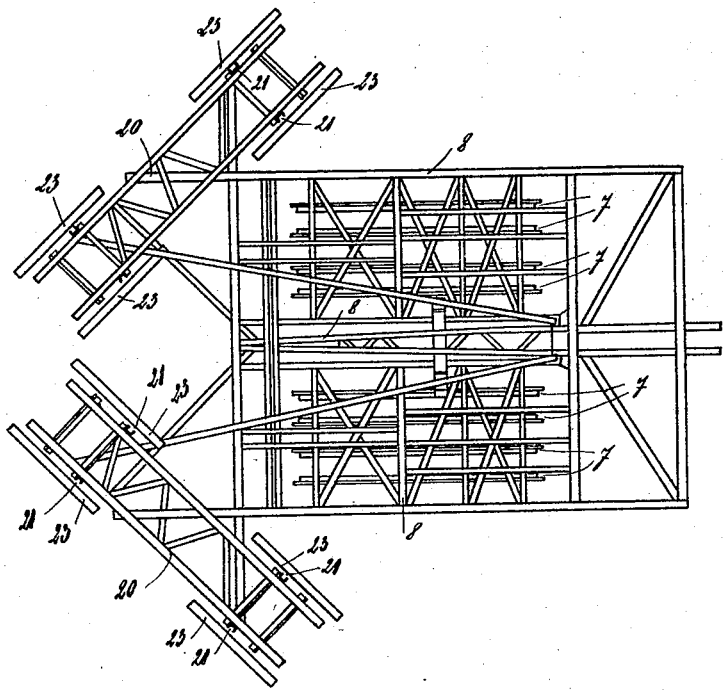
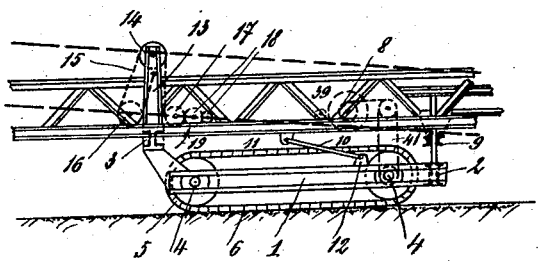
Inventor
S. L. G. Knox

UNITED STATES PATENT OFFICE.

SAMUEL L. G. KNOX, OF SAN RAFAEL, CALIFORNIA.

LEVELING AND PLOWING MACHINE.

1,419,866. Specification of Letters Patent. Patented June 13, 1922.

Application filed November 24, 1920. Serial No. 426,261.

*To all whom it may concern:*

Be it known that I, SAMUEL LIPPINCOTT GRISWOLD KNOX, a citizen of the United States, residing at San Rafael, California, temporarily in Brussels, in the Kingdom of Belgium, have invented certain new and useful Improvements in Leveling and Plowing Machines (for which I have filed an application in Belgium November 22, 1919), of which the following is a specification.

My invention relates to a leveling and plowing machine adapted to be used to restore the soil in countries which have been particularly wasted by the war, for instance by shells so as to render it again suitable for agricultural purposes and the like, or to repair roads such as macadamized roads, the surface of which requires a thorough leveling operation or for other similar purposes, also for the construction of new roads.

One object of my invention consists in so arranging and combining the several parts of the machine that it will be able to travel over loose earth with relatively light pressure and high propulsive power.

Another object of my invention consists in providing adjustable means whereby the action of the soil loosening and leveling means can be easily adjusted and controlled according to the nature of the soil or the depth at which it must be worked.

And another object also consists in providing means for leveling the loosened soil in advance of the machine properly so called by lateral displacement relatively to the direction of travel, with or without additional leveling means at the rear of the machine.

And a still further object consists in providing reliable means for steering the machine during its action.

With these and other objects in view my invention essentially consists in special combinations and arrangements of parts as will be hereinafter fully described and pointed out in the appended claims.

Referring to the annexed drawings, which show diagrammatically one embodiment of my invention:

Fig. 1 is a top view of the whole machine.

Fig. 2 is a side elevation, showing more particularly a self-propelled carriage and part of the soil plowing and leveling means, but without the driving means.

Fig. 3 is a separate top view of the frame of the machine, all the working parts or elements being removed.

Fig. 4 is a detailed view of a part of the principal frame, showing means for adjusting the level of the soil loosening and leveling devices in relation to that of the carriage.

A machine constructed according to my invention essentially comprises a self-propelled carriage and a soil loosening and leveling device supported in front of the carriage, the said device eventually comprising two or more sets of symmetrically disposed travelling members, each provided with a number of plow or other soil-loosening appliances with which scrapers are cooperating, so as to produce a lateral displacement of the surplus soil.

The self-propelled carriage is preferably mounted on caterpillars or equivalent supports, so as to be able to travel over loose earth with relatively light pressure and high propulsive power, according to one object of my invention.

Upon this carriage, a main frame is mounted, said frame being supported at the rear by means of a universal joint upon the rear transverse beam of the self-propelled carriage and near its front part by one or more hoisting or lifting devices cooperating with the frame of the carriage or of the caterpillars so as to be adjustable in height relatively to the self-propelled carriage.

This main frame supports at its front end two auxiliary and preferably diagonal frames provided with tracks and chain wheels, carrying two sets of chains connected by pairs of cross bars to which little carriages are attached, the said carriages being guided in the tracks and carrying each a number of plows or other similar soil loosening means, according to the special use of the machine. Between these auxiliary frames, fixed plows or other soil loosening devices can be placed, for bridging the gap between the sets of travelling plows carried by the auxiliary frames.

Scrapers supported by the main and adjustable frame are arranged behind the auxiliary frames, with a view of leveling the loosened soil in advance of the carriage. Similar adjustable scrapers at the rear of the self-propelled carriage are used to complete the leveling action.

The whole plant is driven by one or more motors transmitting the necessary power to the soil-loosening devices, travelling on the auxiliary frames in front of the machine, and also to self-propelled carriage, this latter transmission including preferably suitable differential arrangements to enable the steering of the carriage.

In view of the above description the arrangement shown in the drawing will be readily understood.

The self-propelled carriage is composed of a number of parallel beams 1, connected at the rear end by a transverse beam 2 and at the front end by a beam 3 (Fig. 4). The beams 1 form the brackets for the shafts 4, carrying the chain-wheels 5 for the caterpillars 6, which are guided along the tracks 7 shown in Fig. 3.

In the example shown eight tracks 7 are provided for the guiding of four caterpillars 6, shown in dotted lines in Fig. 1.

On the rear beam 2 of the carriage, the main frame 8 is supported, in the longitudinal axis of the carriage, by means of a universal joint; said frame 8, which may be further connected to the carriage 1 by a bar pivoted at 11 on the frame and at 12 on the carriage, and is suspended at the front end of the carriage frame 1 from two columns 13, mounted on the transverse beam 3 of the caterpillar-carriage. These columns 13 pass up through the main frame 8 and each support a pulley 14, around which a chain or cable 15 is passed. This chain is fastened at one end to the corresponding column, passes then around a pulley 16, then around the pulley 14 at the end of the column 13, and is finally wound around a hoisting drum 17, which is driven by a train of gearing 18 receiving its motion from an auxiliary motor, or which may also be operated manually. It will be obvious that if the drum 17 is driven in the direction of the arrow 19 (Fig. 4) the chain 15 will be shortened, and the front end of the main frame 8 will be lifted as shown in dotted lines in Fig. 4, the rear end being supported at a fixed height by the beam 2 and the ball and socket joint 9. As there are two columns 13, one on each side of the longitudinal axis of the main frame, as shown in Fig. 1, and as each of these columns may be operated independently, it will be seen that the main-frame not only can be lifted at its front end, but is also adapted to be tilted transversely for a purpose which will be further described.

The main frame 8, in the example shown, carries at its front end two auxiliary frames 20, each formed of a suitable beam provided along the upper and lower girders with tracks 21. At the ends of these auxiliary frames 20 two shafts 22 are mounted in suitable bearings carrying chain wheels 23 (shown diagrammatically in Fig. 3) around which chains 24 are passed. The said chains are connected by pairs at intervals by crossbars 25 (Fig. 1) to which carriages 26 are attached, these carriages being provided with rollers travelling in the tracks 21 of the auxiliary frames or beams 20. Each carriage 26 is provided with one or more plows 27, or other soil-loosening devices, preferably of different heights so as to secure a graduated or progressive action when they are acting upon the ground in front of the machine.

The action of these plows or other soil-loosening devices may be assisted by a number of fixed plows 28, suitably supported at the front end of the main frame 8, and bridging the gap between the two sets of travelling plows 27. Immediately behind the auxiliary frames 20 scrapers 29 are fastened to the main frame, for the purpose of leveling the loosened soil in advance of the carriage by lateral displacement relatively to direction of travel. Similar scrapers 30 are arranged at the rear end of the carriage, and these scrapers are preferably adjustably supported by levers 31, having their fulcrums at 32, on bars 33, which are supported by the beams 1 of the caterpillars. Each of these levers may be acted upon by a hand-wheel 34 and through a suitable screw, in order to control or adjust the height of each scraper according to the requirements. These hand-wheels 34 are arranged on the platform or floor carried by the main frame 8 in proximity to the engineer post or cabin.

The machine just described is driven by a motor or motors 35, each provided with an ordinary change speed gear 36. In the example shown, these motors drive, through a clutch 37 and a differential gearing 38, two transverse shafts 39, each acting upon a differential gearing 40 which commands a pair of caterpillars 6 through a chain 41, or other suitable gear. As a consequence of this arrangement, it is possible by braking any one of several parts of the driving mechanism, to steer the carriage by the variation of speed of the left and right-hand pairs of caterpillars.

The set of motors, further rotates by pinions 42, a shaft 43, which in turn, by aid of pinions 44, causes rotation of a similar shaft 45. The said shafts 43 and 45 pass through the auxiliary frames 20, in which they are supported in suitable bearings, and each carry at the outer end a chain wheel 46 transmitting the motion by a chain 47 to a chain wheel 48, keyed on the end of the shaft 22 carrying the chain wheels 23 for the travelling soil loosening devices 27.

The operation of the machine will now be readily understood.

The self-propelled carriage is moved forward as described by the motors 35, the shafts 39 and the transmitting gears 41 acting upon the caterpillars 6, thus securing the differential control of the elements of the driving mechanism. Simultaneously, the soil loosening devices 27 are caused to travel (through the shaft 43 and 45, the chains 47, shafts 22, chain-wheels 23 and chains 24) around the auxiliary frames 20, thus loosening the soil in advance of the self-propelled carriage. This action is assisted by the fixed plows or soil-loosening devices 28, whilst the loosened soil is leveled by the scrapers 29; the self-propelled carriage thus moves on leveled ground and the operation is finally completed by the action of the rear scrapers 30, which are adjusted so as to secure a perfect distribution of the surplus of earth on the whole surface worked by the machine. If necessary, the main frame 8 may be adjusted in height relatively to the caterpillars by aid of the lifting device 14—15—16—17, or even tilted or adjusted transversely to follow irregularities of the ground transversely to the machine, just as the direct lifting and lowering movements enable the machine to plow at the desired depth.

My invention is obviously not restricted to the above described mechanical means, as indeed these latter could be varied according to the circumstances or to the work which is to be done. Thus it will be obvious that the several soil-loosening and leveling devices shown need not necessarily be in the form of plows and scrapers and that any other form of equivalent devices could also be used; for instance, the fixed plows in front of the carriage could be supplemented if necessary by wire cutters or the like. The steering of the carriage could also be secured by means of rudders in the form of blades or discs passing through the soil or in any other suitable manner.

What I claim is:

1. In a machine of the kind described, the combination of a self-propelled carriage adapted to travel and be steered over loosely leveled soil, a main frame adjustably supported by said carriage, soil-loosening means carried by the main frame in advance of the carriage, means carried by the main frame in rear of the soil loosening means and in advance of and transversely to the longitudinal axis of the carriage for transverse displacement of the loosened soil, and means for independently adjusting the inclination and elevation of the plane of the main frame relative to the plane of the carriage, whereby to control the angle and depth of operation of the soil loosening means.

2. In a machine of the kind described, the combination of a self-propelled carriage adapted to travel and be steered over loosely leveled soil, a main frame adjustably supported by the carriage, soil loosening means carried by the main frame in advance of and transverse to the longitudinal axis of the carriage, leveling means carried by the main frame in rear of the soil loosening means and in advance and transversely to the longitudinal axis of the carriage, and means for independently adjusting the inclination and elevation of the main frame relative to the carriage.

3. In a machine of the kind described, the combination of a self-propelled carriage adapted to travel and be steered over loosely leveled soil, a main frame adjustably supported by said carriage, soil loosening means carried by the main frame in advance of the carriage, fixed scrapers carried by the main frame in rear of the soil-loosening means and in advance of the self-propelled carriage, and means for independently adjusting the inclination and elevation of the plane of the main frame relative to the carriage.

4. In a machine of the kind described, the combination of a self-propelled carriage adapted to travel and be steered over loosely leveled soil, a main frame adjustably supported by said carriage, soil-loosening means carried by the main frame in advance of the carriage, said loosening means including two substantially similar and oppositely moving elements, leveling means carried by the main frame in the rear of the soil-loosening means but in advance of the carriage, and means for independently adjusting the inclination and elevation of the main frame relative to the carriage.

5. In a machine of the kind described a self-propelled carriage, a main frame supported by said carriage, soil loosening means supported by the frame means for moving the said loosening means in front of and at an angle to the path of travel of the carriage, means for leveling the loosened soil in advance of the self-propelled carriage by lateral displacement relatively to the direction of travel and means for adjusting the level of the soil-loosening and leveling means in relation to that of the self-propelled carriage.

6. In a machine of the kind described, a self-propelled carriage, a plurality of caterpillars supporting said carriage, a main frame supported by the self-propelled carriage, angularly related soil loosening means supported by said frame, means whereby the said soil loosening means can be moved in front of the carriage, transversely or obliquely to the direction of travel of the carriage, means for leveling the loosened soil in advance of the self-propelled carriage, means for adjusting the level of the soil-loosening and leveling means, and means for steering the carriage by differential control of the elements of the driving mechanism.

7. In a machine of the kind described a self-propelled carriage a plurality of rolling elements supporting said carriage, a main frame supported by the self-propelled carriage, auxiliary frames supported by the main frame in front of the self-propelled carriage soil-loosening devices travelling along the said auxiliary frames, leveling means cooperating with the said soil loosening devices fixed soil-loosening means supplementing the travelling soil-loosening means, means whereby the level of the soil-loosening and leveling devices can be adjusted in relation to that of the self-propelled carriage adjustable leveling means at the rear of the frame, a driving motor actuating the carriage and the travelling soil loosening devices and means for steering the carriages by differential control of the element of the driving mechanism.

In testimony whereof I have affixed my signature in presence of two witnesses.

SAMUEL L. G. KNOX.

Witnesses:
G. BALARD,
H. SANDENSSONN.